United States Patent [19]

Caufield et al.

[11] Patent Number: 4,974,928
[45] Date of Patent: Dec. 4, 1990

[54] INTEGRAL FIBER OPTIC PRINTHEAD

[75] Inventors: Francis J. Caufield, Lexington; Stephen D. Fantone, Lynnfield; Bennett H. Rockney, Westford, all of Mass.

[73] Assignee: Polaroid Corporation, Cambridge, Mass.

[21] Appl. No.: 332,027

[22] Filed: Apr. 3, 1989

[51] Int. Cl.$^5$ ............................................. G02B 6/08
[52] U.S. Cl. .............................. 350/96.27; 350/227.24; 350/227.26; 350/227.28
[58] Field of Search .................... 346/155, 107 R, 160; 358/302; 350/96.27; 250/227.11, 227.20, 227.23, 227.24, 227.26, 227.28

[56] References Cited

U.S. PATENT DOCUMENTS

| | | | |
|---|---|---|---|
| 4,179,596 | 12/1979 | Bjork | 219/10.55 M |
| 4,279,483 | 7/1981 | England et al. | 354/5 |
| 4,447,126 | 5/1984 | Heidrich et al. | 350/96.31 |
| 4,482,214 | 11/1984 | Hill et al. | 350/355 |
| 4,525,729 | 6/1985 | Agulnek et al. | 346/154 |
| 4,589,732 | 5/1986 | Shiraishi et al. | 350/331 R |
| 4,590,492 | 5/1986 | Meier | 346/107 R |
| 4,715,682 | 12/1987 | Koek et al. | 350/253 |
| 4,740,803 | 4/1988 | Hardy | 354/80 |
| 4,750,799 | 6/1988 | Kawachi et al. | 350/96.11 |
| 4,752,806 | 6/1988 | Haas et al. | 355/3 R |
| 4,767,172 | 8/1988 | Nichols et al. | 350/96.18 |
| 4,921,316 | 5/1990 | Fantone et al. | 350/96.27 |

OTHER PUBLICATIONS

A New LSI Bonding Technology "Micron Bump Bonding Assembly Technology", by K. Hatada et al., 5th IEEE/CHMT International Electronic Manufacturing Technology Symposium–Design-to-Manufacturing Transfer Cycle, Proceedings Date: Oct. 10–12, 1988, pp. 23–27.
A New Technology, "Insulation Resin Bonding-Chip on Substrate Assembly Technology", by Kenzo Hatada et al., Semiconductor Reserach Center, Matsushita Electric Industrial Co., Ltd.

*Primary Examiner*—Frank Gonzalez
*Attorney, Agent, or Firm*—Edward S. Roman

[57] ABSTRACT

An integral sensing head includes a single fiber optic faceplate substrate to which are connected photodiode arrays, circuits for selectively controlling the transmission of electronic information signals from the photodiodes and interconnecting conductive lines all disposed on the same fiber optic faceplate substrate which thereby provides the optical lens system for the photodiodes and a supporting substrate to which the active components are mounted and electrically interconnected by conductive lines.

6 Claims, 1 Drawing Sheet

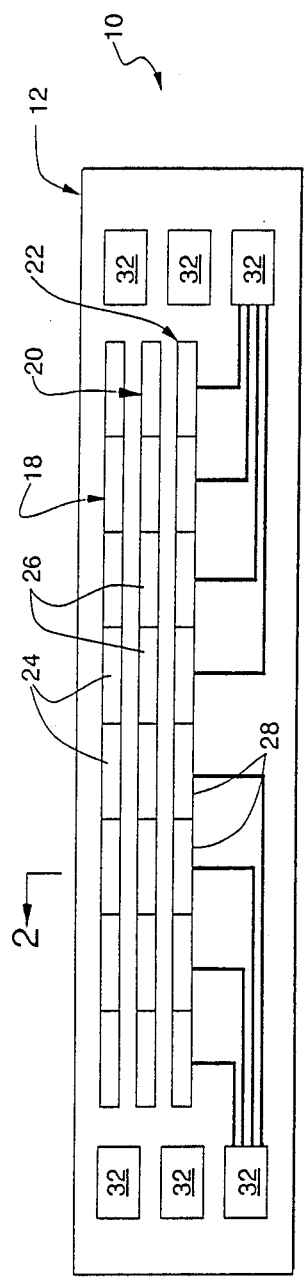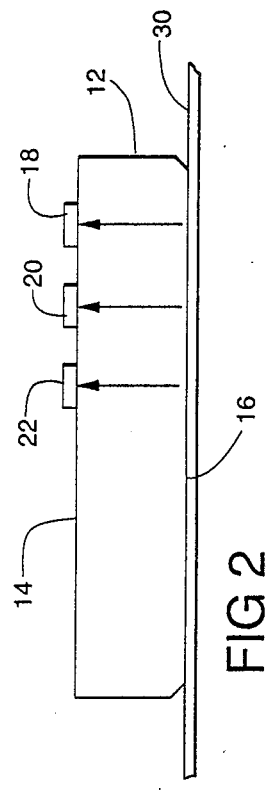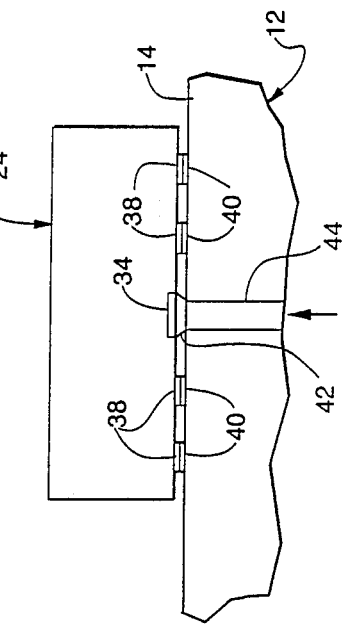

INTEGRAL FIBER OPTIC PRINTHEAD

BACKGROUND OF THE INVENTION

1. Field of the Invention

This invention relates generally to an integral fiber optic sensing head and, more particularly, to a sensing head comprising a single fiber optic faceplate substrate.

2. Description of the Prior Art

Light sensing photodiode arrays are well known in the art for sensing or scanning documents, photographs or the like whereby light reflected from the scanned surface is converted to electronic information signals and subsequently transmitted either for immediate conversion to a facsimile of the surface originally scanned or, alternatively, for storage in any of a well-known variety of memories including both optical and magnetic media. In order to achieve high resolution, a large number of light sensing photodiodes are arranged in a linear array and means are included for providing a relative movement between the linear array and the surface to be sensed so as to effect a scanning movement of the linear array over the surface. Thus, the surface to be sensed may be scanned to provide electronic information signals one line at a time as the photodiode array is advanced relative to the surface either continuously or in a stepping motion. Each photodiode in the linear array is used to sense a corresponding area or pixel on the sensed surface and provide a corresponding electronic information signal value determined by intensity of the light reflected from that area or pixel of the surface. Since the light reflected from each pixel of the surface rapidly diverges, an optical system is needed to transmit the reflected light from the surface to the light sensitive area surface of the photosensitive diodes without substantial divergence.

Therefore, it is a primary object of this invention to provide an integral sensing head structure in which photoresponsive elements such as photodiode arrays and the control circuits therefor can be mounted on a singular substrate.

It is a further object of this invention to provide an integral sensing head structure in which photodiode arrays are more easily connected to a fiber optic lens array which can further act as a substrate to accommodate the mounting and connection of additional support circuitry.

Other objects of the invention will be in part obvious and will in part appear hereinafter. The invention accordingly comprises a structure and system possessing the construction, combination of elements and arrangement of parts which are exemplified in the following detailed disclosure.

SUMMARY OF THE INVENTION

Apparatus for selectively sensing a plurality of longitudinally spaced areas across the face of a surface to be sensed comprises an elongated coherent fiber optic faceplate substrate. The fiber optic faceplate has a substantially planar light receiving surface oppositely spaced apart with respect to a substantially planar light emitting surface. The light receiving surface is stationed to accommodate its close proximity placement to the surface to be sensed in order to receive the light reflected therefrom. There is also provided at least one elongated array of photoresponsive elements comprising a plurality of photodiodes. Each of the photodiodes is closely spaced with respect to an adjacent diode and has a light sensing surface fixedly stationed in close light receiving proximity to the light transmitting surface of the fiber optic faceplate. Conductive interconnecting lines are selectively deposited on the light transmitting surface of the fiber optic faceplate to accommodate select electrical connection to the photodiodes. Means are also provided for electrically connecting the photodiodes to select ones of the conductive interconnecting lines. There are also preferably provided a plurality of control circuits for controlling the transmission of electronic information signals from the photodiodes. The control circuits are also fixedly stationed with respect to the light transmitting surface of the fiber optic faceplate in spaced relation with respect to the photodiodes. There are also provided means for electrically connecting the control circuits to select ones of the conductive interconnecting lines. In the preferred embodiment, the means for electrically connecting the photodiodes and the control circuits to selected ones of the conductive interconnecting lines comprises connections made by the so-called flip chip/solder bumping process.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in conjunction with the accompanying drawings wherein:

FIG. 1 is a plan view of the integral fiber optic sensing head of this invention;

FIG. 2 is a cross-sectional view taken across the lines 2—2 of FIG. 1; and

FIG. 3 is an enlarged cross-sectional view showing a portion of the integral fiber optic sensing head of FIG. 1.

DESCRIPTION OF THE PREFERRED EMBODIMENT

Referring now to FIGS. 1–3, there is shown at 12 the sensing head assembly of this invention comprising a fiber optic faceplate substrate 12. The fiber optic faceplate 12 is configured in an elongated parallelepiped shape having a substantially planar light emitting surface 14 in spaced parallel relation to a substantially planar light receiving surface 16. The fiber optic faceplate comprises a plurality of individual glass fibers which are stacked together, pressed and heated under pressure to form a uniform structure with a plurality of light transmitting passages extending between the light emitting and light receiving surfaces 14, 16. Fiber optic faceplates are well known in the art as taught in U.S. Pat. No. 4,179,596, entitled "Method For Processing Fiber Optic Electronic Components of Electronic Vacuum Device", by C. Bjork, issued Dec. 18, 1979, and now incorporated by reference herein.

Disposed on the light transmitting surface 14 of the fiber optic faceplate 12 are three elongated arrays 18, 20 and 22 comprising, respectively, pluralities of light sensing photodiodes 24, 26 and 28 aligned in side-by-side relationship with respect to each other along the length of each respective array. Each of the photodiodes 24, 26 and 28 is preferably selectively filtered to sense radiation in one of three distinct wavelength ranges as for example red, blue and green. As will be well understood, other wavelength ranges could also be utilized. Alternatively, a single photodiode array could be used in the case where it is not necessary to sense the various color components of the reflected light from the surface to be sensed. The photodiodes 24, 26 and 28 are of conventional construction well known in the art.

A plurality of control circuits 32 are also mounted on the light emitting surface 14 of the fiber optic faceplate 12. Circuits 32 are electrically connected to select ones of the photodiodes 24, 26 and 28 by means of conductive interconnecting lines 40. The conductive interconnecting lines 40 may comprise any suitably conductive metal such as gold, aluminum, etc. deposited on the light emitting surface 14 of the fiber optic faceplate 12 by any well-known technique such as sputtering or evaporation with the excess metallization being thereafter removed by well-known photoresist and etching techniques to provide selective interconnects between the photodiodes 24, 26 and 28 and respective ones of the circuits 32.

Referring specifically to FIG. 3, there is shown an enlarged cross-sectional view of one of the photodiodes 24. Photodiode 24 has metallized contacts as shown at 38 deposited in any well-known manner and a central light sensing area as shown generally at 34. The metallized contacts 38 are electrically connected to respective ones of the conductors 40 by a conventional solder bumping process. The circuits 32 can be interconnected to respective ones of the conductors 40 by the same solder bumping process used to connect the photodiodes or by conventional wire bonding techniques. Since the electrical connections to the fiber optic faceplate substrate 12 are made on the underlying surface of the active elements, the connection technique is generally referred to as the flip chip/solder bumping process. Although the flip chip/solder bumping process is preferred for connecting the active components to selective conductors 40 on the fiber optic faceplate substrate 12, the invention is by no means so limited and other conventional techniques such as wire bonding may also be utilized.

During the operation of the sensing head 12 of this invention, a document, photograph, transparency, or the like provides the surface to be sensed as shown at 30 and is moved relative to the light receiving surface 16 of the fiber optic faceplate substrate 12 to effect a raster line sensing thereof. Light from the surface 30 to the light receiving surface 16 is transmitted via the fused glass fibers of the fiber optic faceplate 12 and emerges from the faceplate by way of the light emitting surface 14. The radiant energy emitted from the light emitting surface 14 of the fiber optic faceplate substrate 12 then diverges slightly in the space between the underlying surface of the light sensing area 34 and the light emitting surface 14. As will be readily understood, the radiation sensed by the photodiodes 24, 26 and 28 is confined in the faceplate fibers with little spending between adjacent fibers to enable discrete pixel areas on the surface 30 to be sensed. The circuits 32 operate to control or direct the electronic information signals from respective ones of the photodiodes 24, 26 and 28 to information storage or transmission devices (not shown) in a manner well known in the art.

Thus, there is provided a simple and economical construction in which a single fiber optic substrate operates to transmit light to photodiode arrays as confined beams to sense well-defined pixel areas of a document, photograph or the like while simultaneously providing a substrate onto which other conductors and circuitry may be deposited by standard techniques.

Other embodiments of the invention including additions, subtractions, deletions, and other modifications of the preferred disclosed embodiments of the invention will be obvious to those skilled in the art and are within the scope of the following claims.

What is claimed is:

1. Apparatus for selectively sensing a plurality of longitudinally spaced areas across the face of a surface to be sensed comprising:

an elongated coherent fiber optic faceplate substrate having a substantially planar light receiving surface oppositely spaced apart with respect to a substantially planar light emitting surface, said light receiving surface being stationed to accommodate its placement in sufficiently close proximity to the surface to be sensed to receive light reflected therefrom;

at least one elongated array comprising a plurality of photoresponsive elements each of said photoresponsive elements being selectively spaced with respect to an adjacent element and having a light sensing surface fixedly stationed in effective light receiving proximity to the light emitting surface of said fiber optic faceplate;

conductive interconnecting lines selectively deposited on the light emitting surface of said fiber optic faceplate to accommodate select electrical connection to said photoresponsive elements; and means for electrically connecting said photoresponsive elements to selected ones of said conductive interconnecting lines.

2. The apparatus of claim 1 further comprising a plurality of control circuits for controlling the transmission of electronic information signals from the photoresponsive elements, said control circuits being fixedly stationed with respect to the light emitting surface of said fiber optic faceplate in spaced relation with respect to said photoresponsive elements, said apparatus also including means for electrically connecting said photoresponsive elements and said control circuits to selected ones of said conductive interconnecting lines.

3. The apparatus of claim 2 wherein said means for electrically connecting said photoresponsive elements and said control circuits to selected ones of said conductive interconnecting lines comprises connections made by the flip chip/solder bumping process.

4. The apparatus of claim 3 wherein said at least one elongated array comprises at least three elongated arrays of photoresponsive elements each of said arrays aligned in substantially parallel spaced relation with respect to each other and sensing radiation in one of three distinct wavelength ranges.

5. The apparatus of claim 2 wherein said fiber optic faceplate comprises a plurality of solid glass fibers extending longitudinally between said light receiving surface and said light emitting surface bonded together in a fused matrix.

6. The apparatus of claim 2 wherein said photoresponsive elements are photodiodes.

* * * * *

UNITED STATES PATENT AND TRADEMARK OFFICE
CERTIFICATE OF CORRECTION

PATENT NO. : 4,974,928
DATED : December 4, 1990
INVENTOR(S) : Francis J. Caufield, Stephen D. Fantone and Bennett H. Rockney It is certified that error appears in the above—identified patent and that said Letters Patent is hereby corrected as shown below:

ON TITLE PAGE:

In the Title:

Cancel "PRINTHEAD" and insert in lieu thereof --SENSING HEAD--.

Signed and Sealed this

Seventh Day of July, 1992

Attest:

DOUGLAS B. COMER

Attesting Officer

Acting Commissioner of Patents and Trademarks